United States Patent
Wise et al.

[19]

[11] Patent Number: 6,160,700
[45] Date of Patent: Dec. 12, 2000

[54] AIR CONDITIONING DISCONNECT ASSEMBLY

[75] Inventors: Randall Dean Wise, New Ulm; Marvin Wayne Menk, Mankato, both of Minn.

[73] Assignee: General Electric Company, Schenectady, N.Y.

[21] Appl. No.: 09/322,461

[22] Filed: May 28, 1999

[51] Int. Cl.[7] .................................................. H02B 1/08
[52] U.S. Cl. ......................... 361/643; 200/293; 361/658
[58] Field of Search ................................ 200/293–296; 361/622, 641, 643, 656–658, 807–810

[56] References Cited

U.S. PATENT DOCUMENTS

| Re. 34,113 | 10/1992 | Miller et al. | 361/356 |
|---|---|---|---|
| 4,675,782 | 6/1987 | Hibbert et al. | 361/356 |
| 5,272,297 | 12/1993 | Reichow et al. | 200/293 |
| 6,028,276 | 2/2000 | Takano et al. | 200/295 |

*Primary Examiner*—Gregory Thompson
*Attorney, Agent, or Firm*—Cantor Colburn LLP; Carl B. Horton

[57] ABSTRACT

A disconnect having a switch mounted within an enclosure is presented. The enclosure comprises a base including a rear wall, and first and second sidewalls extending generally perpendicular from opposing side boundaries of the rear wall. The rear wall and first and second sidewalls define an interior compartment of the base for mounting the switch therein. The enclosure further comprises a cover sized to enclose the interior compartment. At least one pair of opposing protrusions extend inwardly from each of the first and second sidewalls. The pair of protrusions abut against opposing ends of the switch to restrain movement of the switch in a generally perpendicular direction and a laterally upward direction to the rear wall of the enclosure, when the disconnect switch is mounted in the disconnect enclosure. A retaining device, e.g., a ground terminal, abuts against the switch and is secured to the rear wall of the enclosure to restrain movement of the switch in a laterally downward direction.

24 Claims, 5 Drawing Sheets

AIR CONDITIONING DISCONNECT ASSEMBLY

BACKGROUND OF THE INVENTION

The present invention relates generally to electrical disconnects. More specifically the present invention relates to a mounting arrangement for a disconnect switch assembly within an enclosure for an electrical disconnect.

Non-automatic (manual) electrical disconnects are located near equipment, e.g., motors, compressors, motor controls or other electrically driven machinery. The disconnects serve to electrically isolate the equipment from a source of supply power, by enabling a user to manually actuate a disconnect switch and break the circuit conducting the supply power to the equipment. The disconnects protect a user when working on the equipment during such operations as maintenance or replacement of equipment.

The disconnects comprise a disconnect switch assembly (switch) and related connecting equipment, e.g., wires, lugs and ground terminals, housed within a disconnect enclosure (enclosure). The switches come in a variety of configurations, e.g., toggle type and pull type. The disconnects must meet accepted industry standards, e.g., Underwriters' Laboratory standards or National Electric Code standards, depending on their use.

The enclosures for air-conditioning (AC) disconnects must meet Article 430 of the National Electric Code, one such industry standard. Section I of that article states, "a disconnecting means (disconnect) shall be located in sight from the motor location and the driven machinery location." This standard assures that personnel maintaining the air conditioning or refrigeration equipment have complete control of the disconnect to isolate or reconnect equipment from or to an electrical power source. This prevents the equipment from being reconnected to the power source from a remote location while personnel are working on the equipment without their knowledge. Because industrial air conditioning and refrigeration equipment is often located on roof tops or other outdoor locations, the enclosures must be rain proof and environmentally secure such that the components within the enclosure are able to function properly and safely when exposed to various forms of precipitation during outdoor use.

During production, prior art disconnects are assembled by mounting the disconnect switches within the interior compartment of the enclosures with a plurality of mounting screws. This method of assembly problematically requires that an inventory of the screws be maintained and controlled for this operation. Additionally proper production tooling, e.g., screw guns, must be used. For these reasons the use of screws adds significant cost and labor to the production process. Therefore, it is desirable to minimize the number of screws used during assembly.

BRIEF SUMMARY OF THE INVENTION

In an exemplary embodiment of the invention a disconnect enclosure of a disconnect is presented. The disconnect has a switch assembly mounted within the enclosure for manually switching electrical equipment to a source of supply power. The enclosure comprises a base including a rear wall, and first and second sidewalls extending generally perpendicular from opposing side boundaries of the rear wall. The rear wall and first and second sidewalls define an interior compartment of the base for mounting the disconnect switch therein. The enclosure further comprises a cover sized to enclose the interior compartment. A first pair of opposing protrusions extend inwardly from the first and second sidewalls. The first pair of protrusions abut against opposing ends of the disconnect switch to restrain movement of the disconnect switch in a generally perpendicular direction to the rear wall, when the disconnect switch is mounted on the rear wall.

BRIEF DESCRIPTION OF THE DRAWINGS

Referring now to the drawings wherein like elements are numbered alike in the several Figures.

DETAILED DESCRIPTION OF THE INVENTION

Figure 1:
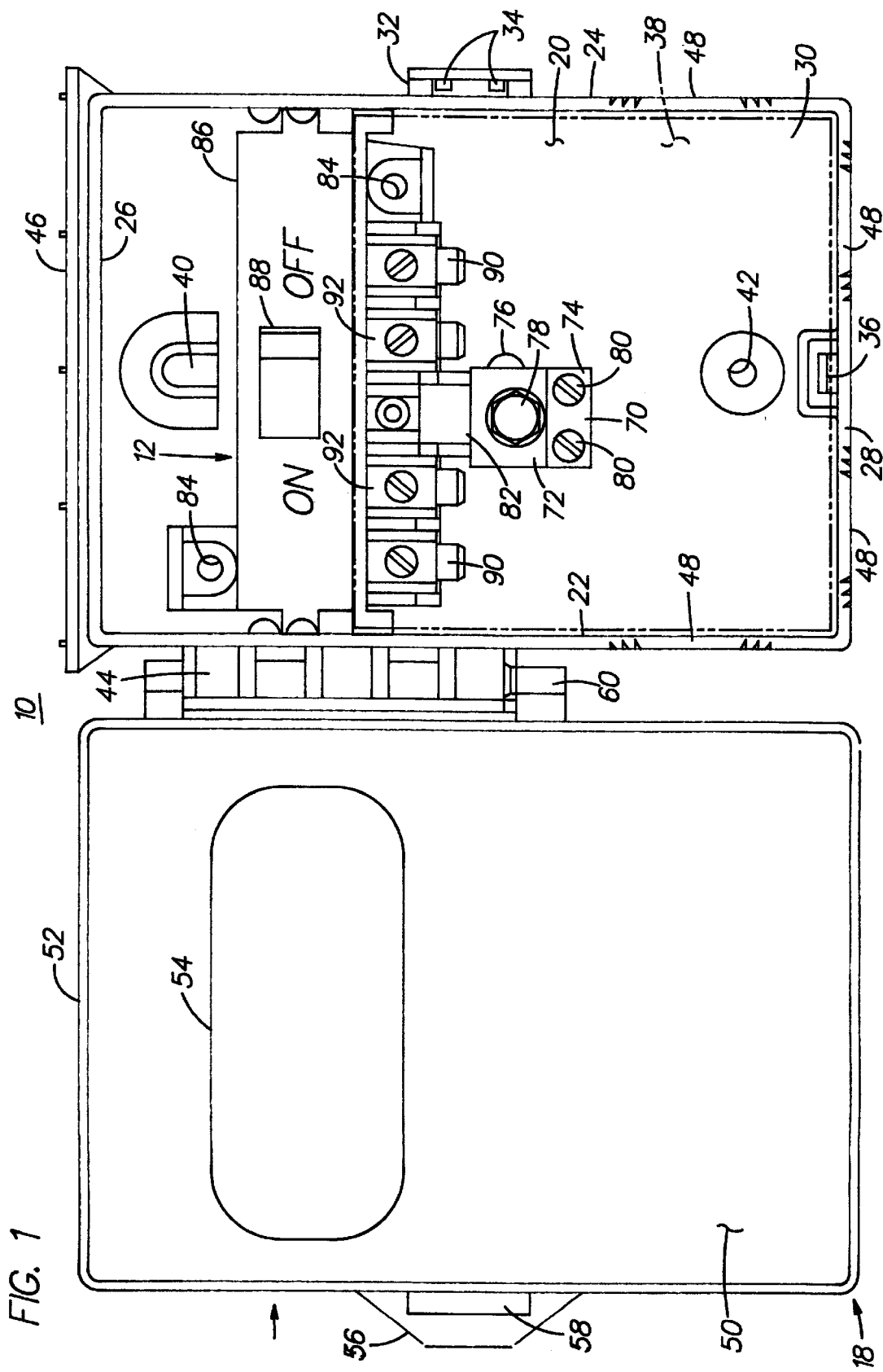
FIG. 1 is a front elevational view of an exemplary embodiment of a disconnect of the present invention having a toggle switch type assembly.

Referring to FIG. 1 an exemplary embodiment of a fully assembled disconnect, such as one for air-conditioning or refrigeration (AC) equipment, is shown generally at 10. The disconnect 10 comprises a toggle-type disconnect switch 12 mounted within a disconnect enclosure 14. The switch 12 serves to isolate the AC equipment from a source of supply power, by enabling a user to manually break the circuit conducting the supply power to the AC equipment.

The disconnect enclosure 14 comprises a molded plastic base 16 and a cover 18, e.g., from a phenylene-oxide plastic sold by General Electric under the trademark "NORLY". The base 16 includes a rear wall 20. A first sidewall 22 and a second sidewall 24 extend generally perpendicular from opposing side boundaries of the rear wall 20. Additionally, an upper wall 26 and a lower wall 28 extend generally perpendicular from upper and lower boundaries of the rear wall 20 respectively. The rear wall 20, first sidewall 22, second sidewall 24, upper wall 26 and lower wall 28 define an interior compartment 30 of the base 16 for mounting the disconnect switch 12 therein.

A cover latch 32 is integral with, and extends above, the sidewall 24. The cover 18 engages the cover latch 32 through the use of a pair of tapered tabs 34 to hold the cover 18 in place. A dead front tab 36 is integral with and positioned on the centerline of the lower wall 28. The dead front tab 36 secures a dead front panel 38 (shown in phantom) to the base 16. The dead front panel 38 extends from the lower half of switch 12 to the lower wall 28, thereby covering all exposed current carrying components to protect personnel from electrical shocks when the cover 18 is open. Hooded mounting slot 40 and dimpled mounting hole 42 are located in the upper and lower sections of the rear wall 20 respectively to provide a means of mounting the enclosure 14 to a structural support (not shown). A plurality of arcuate members 44 extend outwardly from the sidewall 22 to pivotally attach to the cover 18. An upper rim 46 extends outwardly from the upper wall 26 to overlap the cover 18, when the cover encloses the interior compartment 30. The upper rim 46 provides a shield against rain and other forms of precipitation when the AC disconnect 10 is mounted outdoors in an upright position. A plurality of knockouts 48 are located in the lower section of the enclosure 14 to provide electrical access to the interior compartment 30.

The cover 18 includes a front panel 50 and a cover rim 52 that extends around the periphery of the front panel to overlap the walls 20, 22, 24 and 26 of the base 16 when the cover is closed and secured to the base. A portion 54 of the front panel 50 is raised to provide clearance for the disconnect switch 12 when the cover encloses the base 16. A hasp 56 extends outwardly from the rim 52 and includes an opening 58 for receiving the cover latch 32. When the cover 18 is closed, the cover latch passes through the hasp 56, whereby the pair of tabs 34 engage the front panel in a snap fit manner to releasably secure the cover to the base. An axle 60 extends outwardly from an opposing side portion of the rim 52 to pivotally engage with the arcuate members 44. The axle 60 and the arcuate members 44 form a hinge, which secures and aligns the cover 18 to the base 16.

Figure 3:
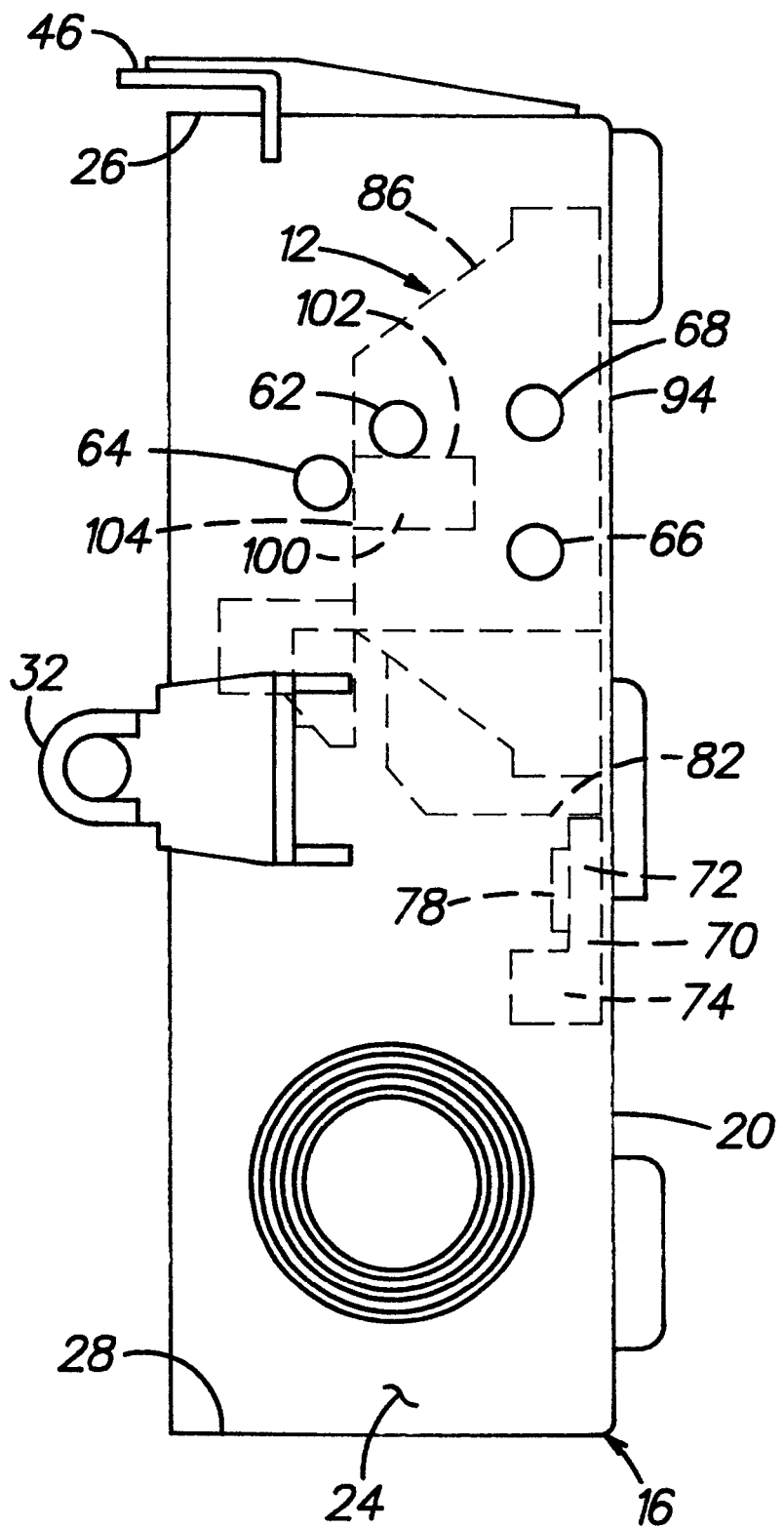
FIG. 3 is a side elevation view of the disconnect of FIG. 1.

As best shown in FIG. 3, the base 16 includes a plurality of protrusions 62, 64, 66 and 68 extending generally perpendicular from each sidewall 22 and 24. Protrusions 62 and 64 abut the switch 12 to restrain movement of the switch in a generally perpendicular direction to the rear wall 20, as well as a laterally upward direction to the rear wall 20, when the switch 12 is mounted in the enclosure 14. A ground terminal 70 is generally L-shaped and comprises a flat mounting leg 72 which extends along the rear wall 20, and a terminal leg 74 extending outwardly from the rear wall 20. The ground terminal 70 is screwed into a mounting hole 76 via mounting screw 78 through the mounting leg 72. The terminal leg 74 contains a pair of terminal lugs 80 for connecting ground wires thereto. The ground terminal 70 functions not only as an electrical earth ground, but additionally as a retaining device. A lower edge 82 of the switch 12 abuts against the mounting leg 72 of the ground terminal 70 to restrain movement of the disconnect switch 12 in a laterally downward direction to the rear wall 20.

Advantageously protrusions 62 and 64 reduce the number of screws needed to mount the switch 12 to the enclosure 14 by two. Other prior art disconnects require two mounting screws (not shown) for securing the switch 12 to the wall 20 through a pair of switch mounting holes 84.

The disconnect switch 12, shown in FIG. 1, is of the toggle-type. The toggle-type disconnect switch 12 comprises a generally rectangular switch base 86, a toggle 88 having slidable contacts (not shown), a pair of line lugs 90, and pair of load lugs 92. Line current conductors (not shown) enter the enclosure 14 through the knockouts 48 and connect with the line lugs 90. Similarly, load current conductors connect with the load lugs 92 and conduct load current to air conditioning or refrigeration equipment through the knockouts 48. Neutral current conductors of the air conditioning equipment enter the enclosure through the knockouts 48 and are connected to ground through the terminal leg 74 of the ground terminal 70. When the toggle 88 is in the "on" position, the slideable contacts of the toggle 88 provide continuity between the line lugs 90 and the load lugs 92 respectively.

When the toggle 88 is in the "off" position, the slideable contacts of the toggle 88 break continuity with the line lugs 90 and the load lugs 92 to interrupt current flow and provide electrical isolation to the air conditioning or refrigeration equipment.

Figure 2:
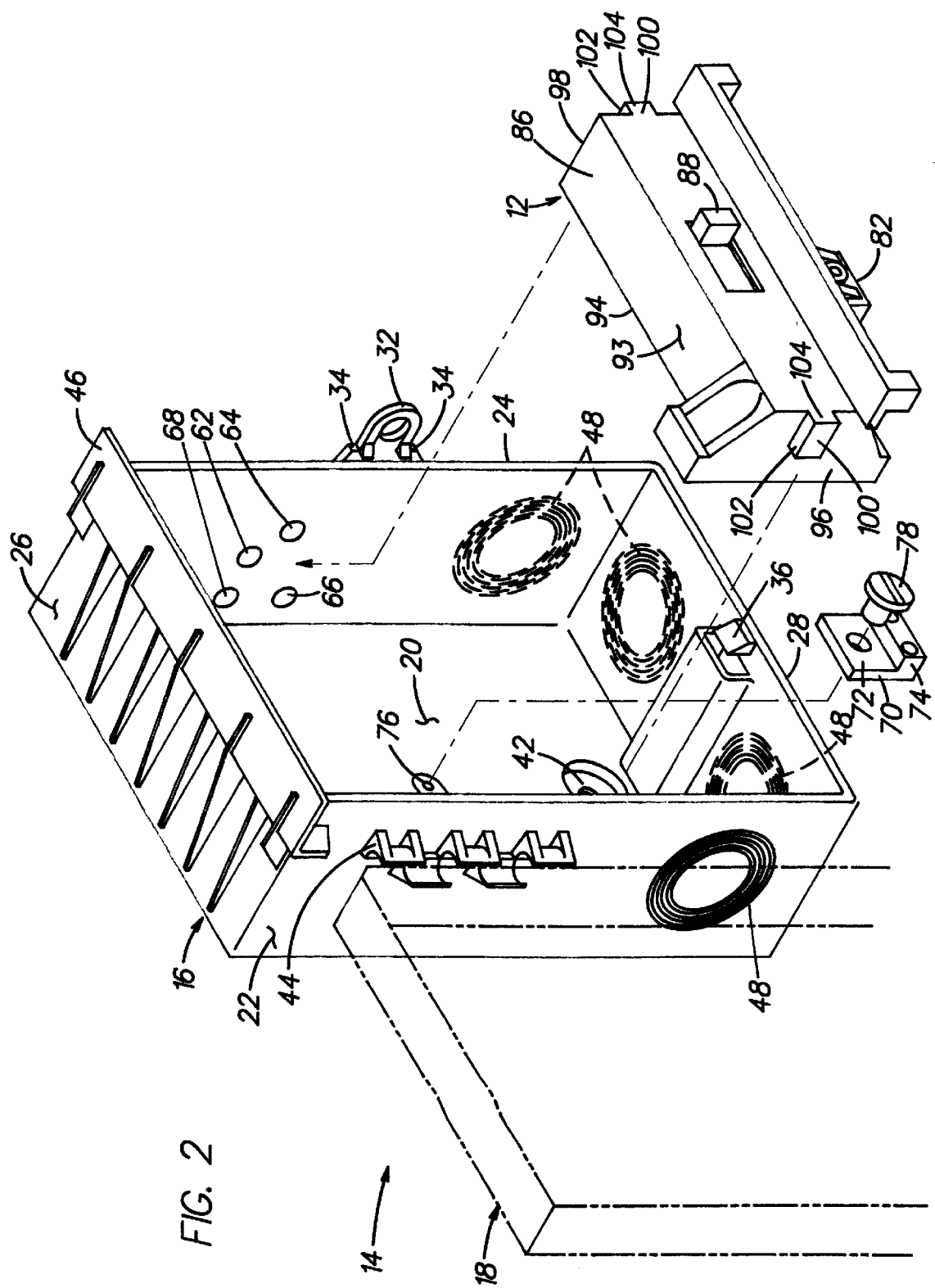
FIG. 2 is an exploded view of the disconnect of FIG. 1.

Referring to FIGS. 2 and 3, the switch base 86 of the switch 12 is generally rectangular in shape. The base 86 has an upper surface 93 which faces in the direction of the upper wall 26, and a bottom surface 94 which abuts against the rear wall 20 when the switch 12 is mounted to the enclosure 14. The base 86 further includes opposing side surfaces 96 and 98, which extend generally perpendicular from the bottom surface 94. A pair of rectangular mounting tabs 100 of the base 86 extend outwardly from the surfaces 96 and 98 a predetermined distance which defines the overall width of the base 86 approximately equal to the distance between the sidewalls 22 and 24 of the base 16. The mounting tabs 100 have an upper side surface 102 which faces in the direction of the upper wall 26, and a top surface 104 which faces outwardly when the switch 12 is mounted to the rear wall 20. The side surface 102 of the mounting tabs 100 abuts against the protrusion 62, and the top surface 104 abuts against the protrusion 64 when the switch 12 is mounted to the enclosure 14.

The switch 12 is mounted to the enclosure 14 by first placing the bottom surface 94 of the switch flush against the lower section of the rear wall 20 of the enclosure. The switch 12 is then slid laterally upwards until the side surface 102 of the tabs 100 engages each protrusion 62 to restrain any further movement of the switch 12 in the laterally upward direction. Simultaneously, the top surface 104 of the tabs 100 slides under each protrusion 64 to restrain any further movement of the switch 12 perpendicular to the rear wall 20. The ground terminal 70 is then fastened to the mounting hole 76 with the mounting screw 78. The mounting leg 72 of the ground terminal 70 abuts up against the lower edge 82 of the switch base 86 to restrain the switch 12 from moving in the laterally downward direction, and to securely mount the switch 12 within the enclosure 14.

The switch 12 is of a prior art design such that it is mounted to other prior art enclosures via mounting screws through the switch mounting holes 84 of the base 86. The protrusions 62 and 64 of the enclosure 14 of the present invention advantageously replace the use of the mounting screws through the switch mounting holes 84. Therefore the time and labor required to mount the switch 12 to the enclosure 14 is significantly reduced relative to other prior art disconnects.

Figure 4:
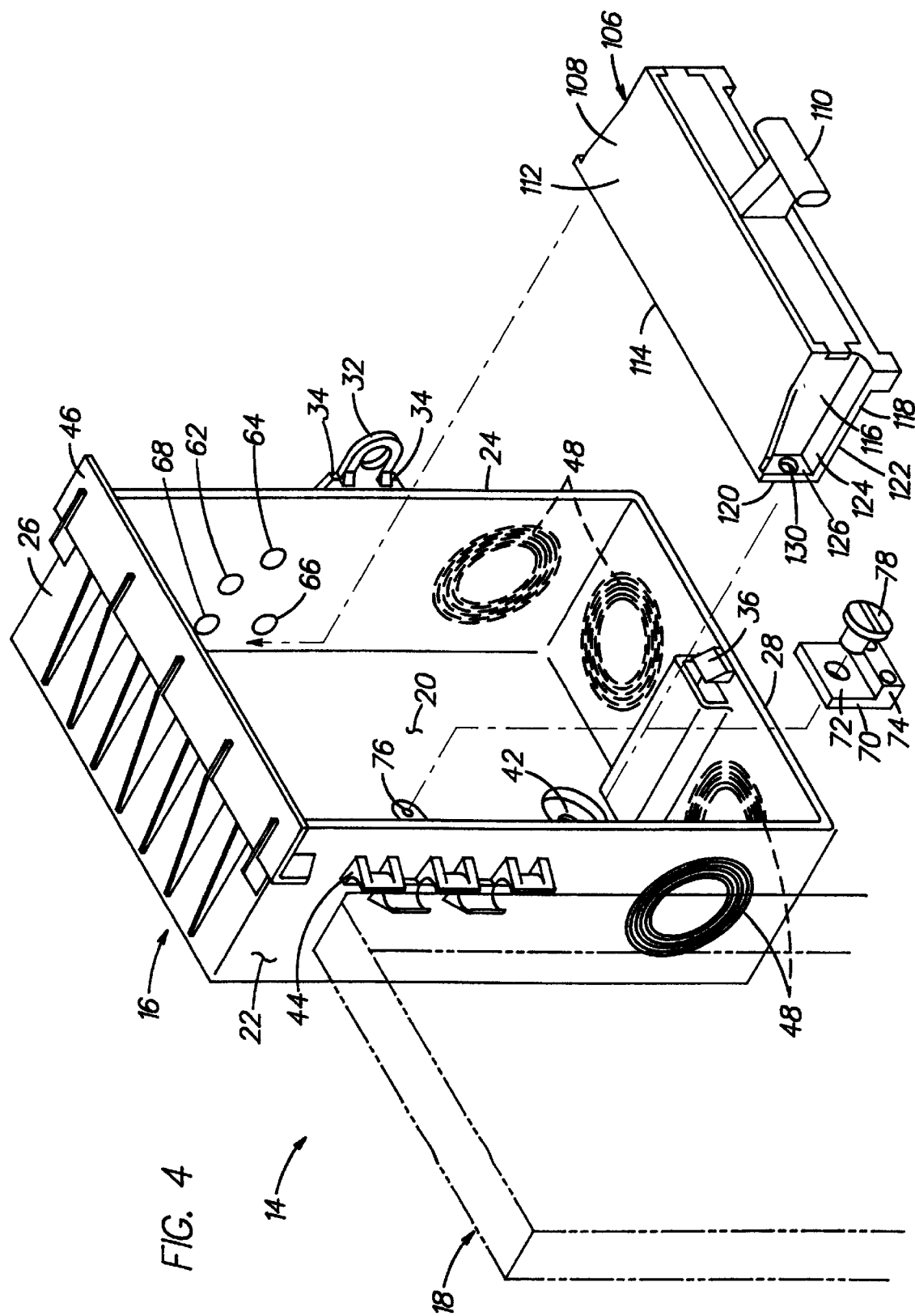
FIG. 4 is an exploded view of an alternative exemplary embodiment of a disconnect in accordance with the present invention having a pullout switch type assembly.
Figure 5:
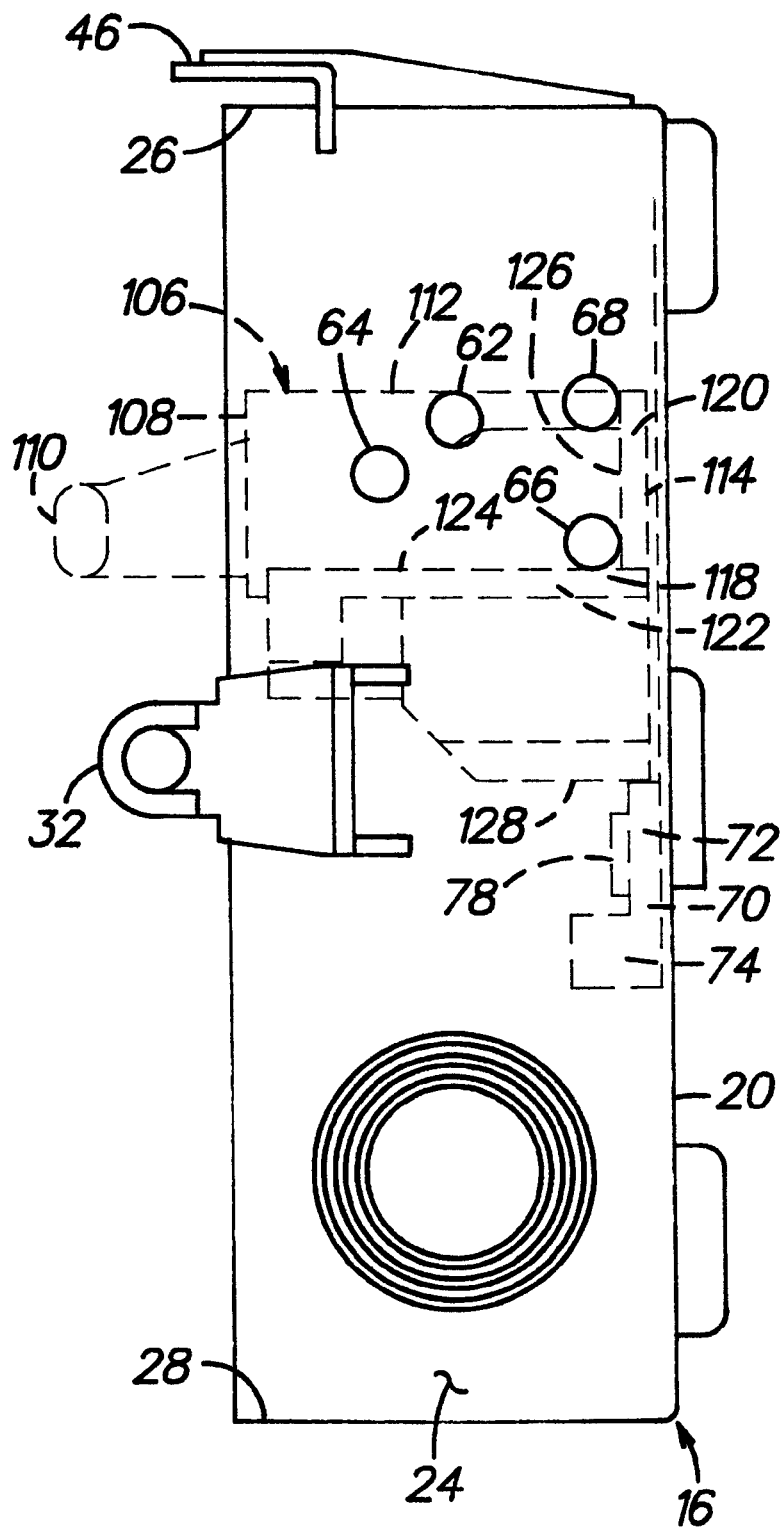
FIG. 5 is a side elevation view of the disconnect of FIG. 4.

Referring to FIGS. 4 and 5 an alternative exemplary embodiment of the present invention is shown using a pull type disconnect switch 106. The switch 106 comprises a generally rectangular base 108, pullout head 110, the pair of line lugs 90, and the pair of load lugs 92.

The pullout head 110 has a set of blades (not shown) which function in much the same manner as the sliding contacts of the toggle 88. That is when the pullout head is fully inserted into the base 108 in the "on" position, the pullout blades provide continuity between the line lugs 90 and the load lugs 92. When the pullout head is removed, turned 180° and reinserted into the base 108 (the "off" position), continuity between the line lugs 90 and the load lugs 92 is interrupted.

The pullout base 108 comprises an upper surface 112, which faces in the direction of upper wall 26, and a bottom surface 114 which mounts flush against the rear wall 20. The base 108 further includes pair of opposing side surfaces 116, which extend generally perpendicular from the bottom surface 114. A pair of L-shaped mounting flanges 118 of the base 108 extend outwardly from the surfaces 116 a predetermined distance to define the overall width of the base 108 approximately equal to the distance between the sidewalls 22 and 24 of the base 16. The flanges 118 have a vertical leg 120 extending along the bottom edge of the surfaces 116, and a horizontal leg 122 extending along the lower edge of the surfaces 98. The horizontal legs 122 have an upper side surface 124, which faces in the direction of the upper wall 26. The vertical legs 120 have a top surface 126, which faces outwardly when the switch 106 is mounted to the rear wall 20. The side surface 124 of the horizontal leg 122 abuts against the protrusion 66, and the top surface 126 of the vertical leg 120 abuts against the protrusions 66 and 68 when the switch 106 is mounted to the enclosure 14.

The pull out switch 106 is mounted to the enclosure 14 by first placing the bottom surface 114 of the switch flush against the lower section of the rear wall 20 of the enclosure. The switch 106 is then slid laterally upwards until the side surface 124 of the horizontal leg 122 engages the protrusion 66 to restrain any further movement of the switch 106 in the laterally upwards direction. Simultaneously, the protrusions 66 and 68 slide over the top surface 126 of the vertical leg 120 to restrain any further movement of the switch 106 perpendicular to the rear wall 20. The ground terminal 70 is then fastened to the mounting hole 76 with the mounting screw 78. The mounting leg 72 of the ground terminal 70 abuts against a lower edge 128 of the switch base 108 to restrain the switch 106 from moving in the laterally downward direction, and to securely mount the switch 106 within the enclosure 14.

The switch 106 is of prior art design such that it is mounted to other prior art enclosures via mounting screws through a pair of switch mounting holes 130, located in vertical legs 120 of base 108. The protrusions 66 and 68 of the enclosure 14 of the present invention advantageously replace the use of the mounting screws through the switch mounting holes 130. Therefore the time and labor required to mount the switch 106 to the enclosure 14 is significantly reduced relative to the prior art AC disconnects.

In another alternative exemplary embodiment of the present invention, the upper surface 112 of the pull type disconnect switch 106 is mounted flush against the upper wall 26. Since the upper wall 26, serves as the restriction to upward lateral movement, the protrusion 66 is eliminated. Protrusion 68 is located over the top surface 126 of the vertical leg 120, and restricts movement of the switch 106 generally perpendicular to the rear wall 26. Additionally, the mounting leg 72 of the ground terminal 70 abuts against the lower edge 128 of the switch base 108 to restrain the switch 106 from moving in the laterally downward direction, and to securely mount the switch 106 within the enclosure 14. In this embodiment, the protrusion 68 is the only protrusion required to securely mount the switch 106 to the enclosure 14.

Similarly, in another alternative exemplary embodiment of the present invention, the mounting holes 84 of the toggle type disconnect switch 12 are eliminated, and the upper surface 93 of the switch 12 is mounted flush against the upper wall 26. Since the upper wall 26, serves as the restriction to upward lateral movement, the protrusion 62 is eliminated. In this embodiment, the protrusion 64 is the only protrusion required to securely mount the switch 12 to the enclosure 14.

While exemplary embodiments apply to disconnects having molded plastic enclosures, one skilled in the art would also recognize that the enclosure can be constructed of other materials as well, e.g., metal. In metal enclosures, protrusions can be formed by such processes as stamping or welding.

While preferred embodiments have been shown and described, various modifications and substitutions may be made thereto without departing from the spirit and scope of the invention. Accordingly, it is understood that the present invention has been described by way of illustrations and not limitations.

What is claimed is:

1. A disconnect enclosure of a disconnect, the disconnect having a disconnect switch mounted within the enclosure for manually disconnecting electrical equipment from a source of supply power; the disconnect enclosure comprising:

a base including, a rear wall, and first and second sidewalls extending generally perpendicular from opposing side boundaries of the rear wall, the rear wall and first and second sidewalls defining an interior compartment of the base for mounting the disconnect switch therein, each of the first and second side walls having one of a first pair of opposing protrusions extending inwardly, wherein the first pair of protrusions abut against the disconnect switch to restrain movement of the disconnect switch in a generally perpendicular direction to the rear wall, when the disconnect switch is mounted in the disconnect enclosure; and a cover sized to enclose the interior compartment.

2. The enclosure of claim 1 wherein the first pair of protrusions further restrain movement of the disconnect switch in a laterally upward direction to the rear wall.

3. The enclosure of claim 1 wherein each of the first and second sidewalls further includes one a second pair of protrusions extending inwardly, wherein the second pair of protrusions abut against the disconnect switch to restrain movement of the disconnect switch in a laterally upward direction to the rear wall.

4. The enclosure of claim 3 wherein each of the first and second side walls further includes one of a third pair of protrusions extending inwardly, wherein the third pair of protrusions is arranged to abut against a second disconnect switch to restrain movement of the second disconnect switch in a generally perpendicular direction to the rear wall, when the second disconnect switch is mounted in the disconnect enclosure.

5. The enclosure of claim 4 wherein each of the first and second side walls further includes one of a fourth pair of protrusions extending inwardly, wherein the fourth pair of protrusions is arranged to abut against the second disconnect switch to restrain movement of the second disconnect switch in a laterally upwards direction to the rear wall.

6. The enclosure of claim 1 further comprising a retaining device secured to the rear wall, wherein the retaining device abuts against the disconnect switch to restrain movement of the disconnect switch in a laterally downward direction to the rear wall.

7. The enclosure of claim 6 wherein the retaining device comprises a ground terminal mounted to the rear wall.

8. The enclosure of claim 1 wherein the base further comprises an upper wall extending generally perpendicular from an upper boundary of the rear wall, wherein the upper wall restrains movement of the disconnect switch in a laterally upward direction to the rear wall.

9. The enclosure of claim 4 wherein:

the disconnect switch comprises a toggle disconnect switch; and the second disconnect switch comprises a pullout disconnect switch.

10. The enclosure of claim 1 wherein the enclosure is formed of at least one of a molded polymeric material and a metallic material.

11. A disconnect for manually disconnecting electrical equipment from a source of supply power, the disconnect comprising:

a disconnect switch; and an enclosure including:

a base including, a rear wall having the disconnect switch mounted thereon, and first and second sidewalls extending generally perpendicular from opposing side boundaries of the rear wall, the rear wall and first and second sidewalls defining an interior compartment of the base, each of the first and second sidewalls having one of a first pair of opposing protrusions extending inwardly, wherein the first pair of protrusions abut against the disconnect switch to restrain movement of the disconnect switch in a generally perpendicular direction to the rear wall, when the disconnect switch is mounted in the enclosure, and a cover sized to enclose the interior compartment.

12. The disconnect of claim 11 wherein the first pair of protrusions further restrain movement of the disconnect switch in a laterally upward direction to the rear wall.

13. The disconnect of claim 11 wherein each of the first and second side walls further includes one of a second pair of protrusions extending inwardly, wherein the second pair of protrusions abut against the disconnect switch to restrain movement of the disconnect switch in a laterally upward direction to the rear wall.

14. The disconnect of claim 13 wherein each of the first and second side walls further includes one of a third pair of protrusions extending inwardly, wherein the third pair of protrusions is arranged to abut against a second disconnect switch to restrain movement of the second disconnect switch in a generally perpendicular direction to the rear wall, when the second disconnect switch is mounted in the disconnect enclosure.

15. The disconnect of claim 14 wherein each of the first and second side walls further includes one of a fourth pair of protrusions extending inwardly, wherein the fourth pair of protrusions is arranged to abut against the second disconnect switch to restrain movement of the second disconnect switch in a laterally upwards direction to the rear wall.

16. The disconnect of claim 11 further comprising a retaining device secured to the rear wall, wherein the retaining device abuts against the disconnect switch to restrain movement of the disconnect switch in a laterally downward direction to the rear wall.

17. The disconnect of claim 16 wherein the retaining device comprises a ground terminal mounted to the rear wall.

18. The disconnect of claim 11 wherein the base further comprises an upper wall extending generally perpendicular from an upper boundary of the rear wall, wherein the upper wall restrains movement of the disconnect switch in a laterally upward direction to the rear wall.

19. The disconnect of claim 14 wherein:

the disconnect switch comprises a toggle disconnect switch; and the second disconnect switch comprises a pullout disconnect switch.

20. The disconnect of claim 11 wherein the enclosure is formed of at least one of a molded polymeric material and a metallic material.

21. The disconnect of claim 11 wherein the disconnect switch further includes:

a switch base including a pair of mounting tabs extending outwardly from the switch base a predetermined distance, the tabs having a first surface for abutting against the first pair of protrusions to restrain movement of the disconnect switch in the generally perpendicular direction from the rear wall of the base.

22. The disconnect of claim 13 wherein the disconnect switch further includes:

a switch base including a pair of mounting tabs extending outwardly from the switch base a predetermined distance, the tabs having a first surface for abutting against the first pair of protrusions to restrain movement of the disconnect switch in the generally perpendicular direction from the rear wall of the base, and having a second surface for abutting against the second pair of protrusions to restrain movement of the disconnect switch in the laterally upward direction.

23. The disconnect of claim 14 wherein the second disconnect switch further includes:

a switch base including a pair of mounting flanges extending outwardly from the switch base a predetermined distance, the flanges having a first surface for abutting against the third pair of protrusions to restrain movement of the second disconnect switch in the generally perpendicular direction from the rear wall of the base.

24. The disconnect of claim 15 wherein the second disconnect switch further includes:

a switch base including a pair of mounting flanges extending outwardly from the switch base a predetermined distance, the flanges having a first surface for abutting against the third pair of protrusions to restrain movement of the second disconnect switch in the generally perpendicular direction from the rear wall of the base, and having a second surface for abutting against the fourth pair of protrusions to restrain movement of the second disconnect switch in the laterally upward direction.

* * * * *